United States Patent Office 3,732,124
Patented May 8, 1973

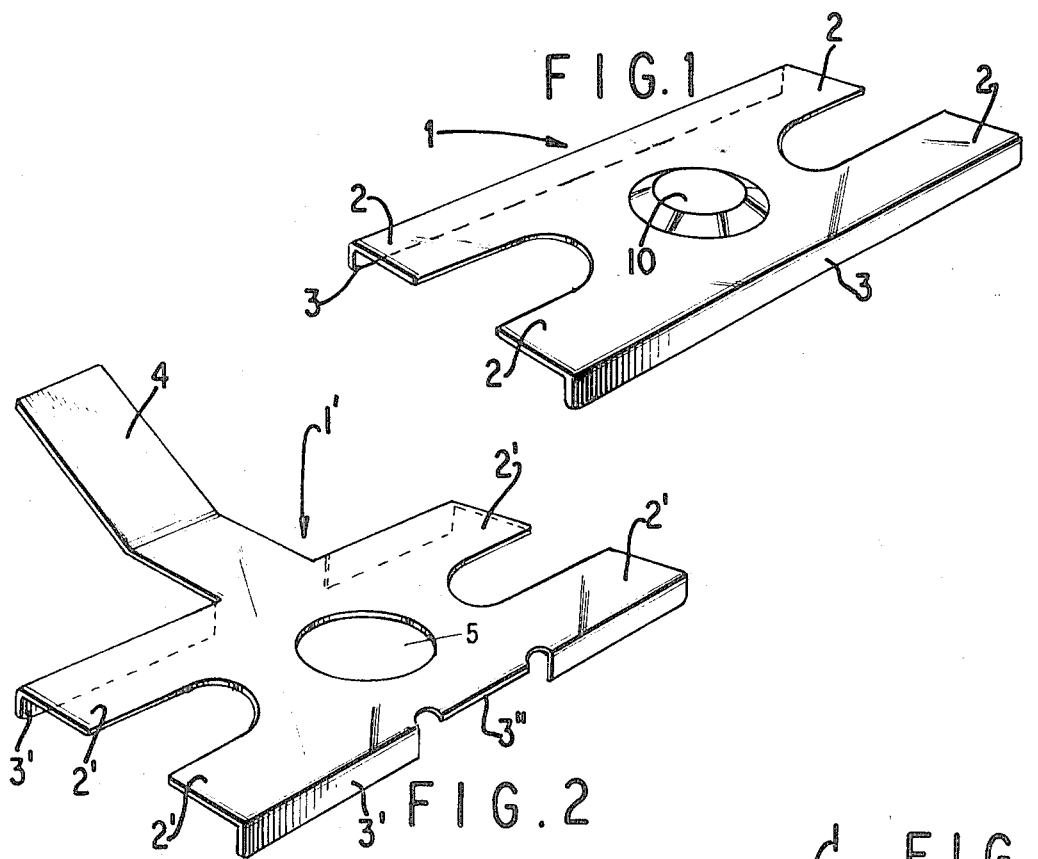
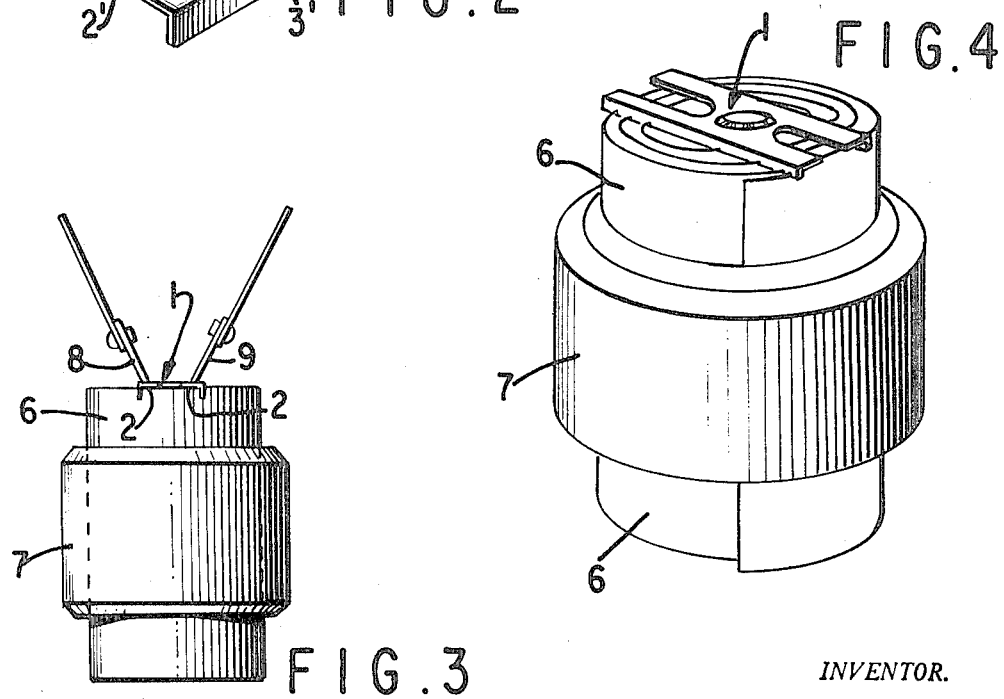

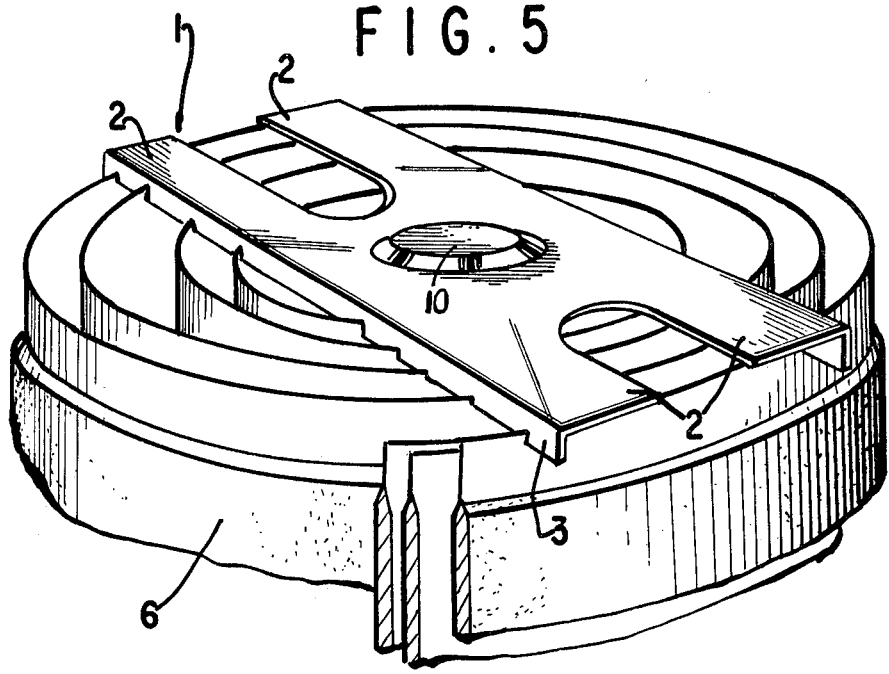
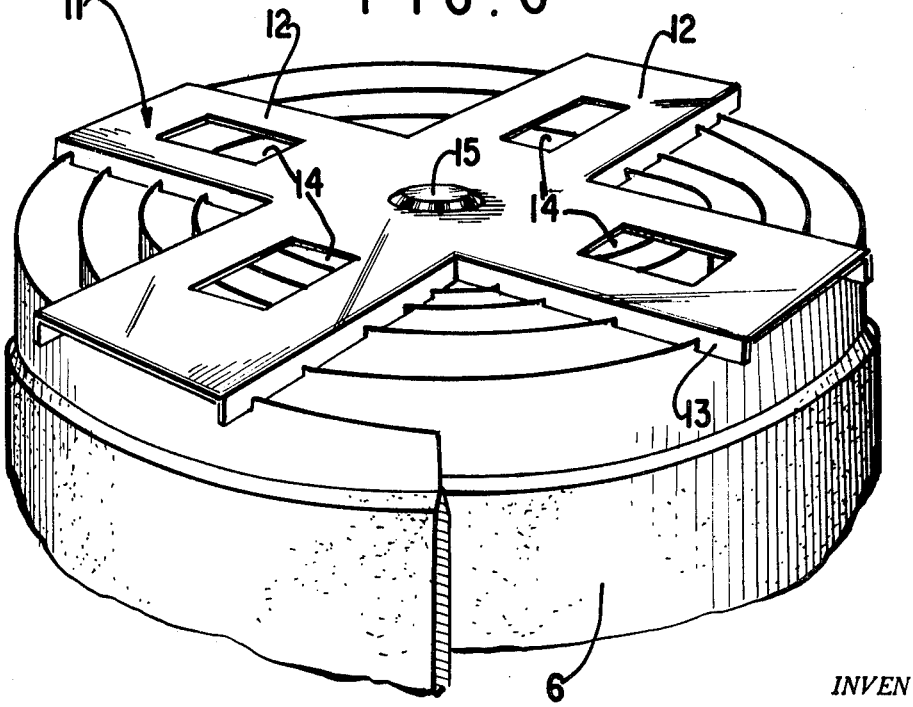

---

3,732,124
ELECTROCHEMICAL CELLS COMPRISING CURRENT COLLECTOR MEMBER EMBEDDED INTO THE PROTRUDING EDGES OF THE ELECTRODES
Jean-Pierre Cailley, Ambares, France, assignor to Societe des Accumulateurs Fixes et de Trection (Societe Anonyme) Romainville, France
Filed June 28, 1971, Ser. No. 157,163
Claims priority, application France, July 1, 1970, 24,413
Int. Cl. H01m 35/32
U.S. Cl. 136—13        8 Claims

ABSTRACT OF THE DISCLOSURE

Electrochemical cells involving an assembly of opposite polarity electrodes having bared carrier portions projecting respectively at opposite ends of the assembly with current collectors welded respectively at opposite ends of the assembly to the bared projecting carrier portions of the electrodes with accompanying embedment effected during welding under pressure of said bared portions into projections provided on the current collectors.

BACKGROUND OF INVENTION

The invention relates to electric or electrochemical cells provided with an assembly of electrodes and separators, the assembly comprising either wound electrodes or plane electrodes, in which electrodes of one polarity and the electrodes of opposite polarity project respectively on opposite side or ends of the assembly by conductive portions, preferably comprising bared edge portions of the metal carriers of the said electrodes.

In such cells, the current collectors can comprise metal plates welded onto the bare edges of the projecting conductive portions of the electrodes.

The electrical welding operation is usually effected by application of electrodes of a welding machine to bear on the said plates and of auxiliary electrodes to bear on the edges of the projecting portions so that the current can flow between the electrodes bearing on the plates, the plates, the projecting portions and the auxiliary electrodes.

I have, however, been able to observe that in a great number of cases, the welds thus made were of bad quality and the current collector plates could easily be detached.

This is mainly due to the fact that the contacts between the plates and the projecting portions of the electrodes are exclusively linear and can, moreover, not be in an appropriate uniform contacting position for all the edges of the electrodes as the latter are not always at the same level.

Objects and features of the present invention, more particularly, are to overcome these disadvantages.

The invention provides an electric cell having an assembly of electrodes and separators, the electrodes being either wound electrodes or plane in the assembly and in which electrodes of one polarity and electrodes of opposite polarity project respectively at opposite sides or ends of the assembly in conductive portions, preferably constituted by bared parts of the metal carriers of the said electrodes, the said projecting bared parts being respectively welded at the ends or sides of the assembly to a current collector member, the said cell being further characterized in that each said current collector member or plate comprises edges substantially perpendicular to its average plane and which edges are embedded by welding into the bared projecting parts of the respective electrodes.

According to another characteristic of the invention, each current collector member comprises recesses.

According to one embodiment of the invention, each current collector or plate is substantially H-shaped, the peripheral edges being preferably provided in the vertical bars of the H-shape.

According to another embodiment, the plate has a cruciform shape or other suitable configuration.

Another object and feature of the invention is the provision of a method for manufacturing such a cell. This novel method is characterized more particularly in that each current collector or plate is united to an electrode by means of a capacitor discharge welding operation during which the collector or plate is pressed against the bare projecting parts of the electrode while the dimensions of the assembly of electrodes and separators are maintained at the desired final dimensions of that assembly in the finished cell.

According to an embodiment of the invention, the welding operation is effected by application of two electrodes of a capacitor discharge welding machine each bearing with pressure respectively on a part of the current collector or plate close to an edge, the pressure of the electrodes on the said current collector or plate being of the order of 10 kg./sq. cm.

It should be noted that for the implementing of the invention the use of a current collector or plate provided with edges, although necessary, is not alone sufficient. It must in addition be possible for these edges to become embedded in the projecting parts of the electrodes during welding. In this manner, any unevenness in the levels between projecting bared parts of the electrode edges is compensated.

Other objects and characteristics of the invention will become apparent from the following detailed description and from the accompanying drawing, wherein:

FIG. 1 is a perspective view of an embodiment of the invention showing a current collector or plate to be mounted in a cell according to the invention;

FIG. 2 is a variant of FIG. 1;

FIG. 3 illustrates diagrammatically the manner in which the current collector or plate is welded to bared edge portions of an electrode;

FIG. 4 is a perspective view of an assembly of electrodes and separators provided at one of its ends with the current collector or plate shown in FIG. 1;

FIG. 5 is a fragmentary view on a larger scale of the end of the assembly shown in FIG. 4 which carries the attached current collector or plate; and FIG. 6 is a view similar to FIG. 5, using another embodiment of the current collector or plate.

DETAILED DESCRIPTION

In FIG. 1, the reference 1 designates a metal current collector or plate, for example, made of nickel-plated steel, which is H-shaped. The vertical bars 2 of the H are provided with depending edges 3 extending substantially perpendicular to the average plane of the collector plate.

FIG. 2 is a variant of the collector plate of FIG. 1.

In this embodiment, the current collector plate 1' is provided on one of its vertical bars with a tab 4 which can be folded down, and in the horizontal bar of the H with a centrally located recess 5.

This current collector plate embodiment is intended particularly for providing the current collector, which is, for example, positive, at the upper part of the cell. After union of this plate to the positive electrode, the tab 4 is folded in order to be electrically connected to the cover of the casing containing the cell, the recess 5 enabling the electrolyte to be inserted into the cell.

For use with wound electrodes, the edges 3' of the current collector plate 1' may be interrupted at 3'' in the regions of the cross bar of the H as shown in FIG. 2, that part of the collector plate corresponding substantially to the central channel of the wound assembly block of electrodes and separators.

The application and welding of the current collector plates of respective electrodes is effected as follows:

After completion of assembly of a group of electrodes and separators in block form or in wound assembly with bared edge portions of carriers of the respective electrodes projecting outwardly at opposite sides or ends of such assembly, the dimensions of the assembly of electrodes and separators are maintained at the finally desired dimensions of the assembly in the finished cell or generator, for example, by means of a surrounding ring 7, e.g. of metal. The assembly is then mounted in a capacitor discharge welding machine.

A current collector plate is then applied over the top of the assembly with its edges engaging the bared portions of the electrode underlying it and it is held pressed in this position by means of the electrodes of the welding machine, these electrodes bearing on the vertical bars of the H of the current collector plate near the said edges.

By way of example which is in no way limiting, the pressure exerted by the electrodes can be in the order of 10 kg./sq. cm.

The weld between the plate and the bared portion of the particular electrode of the cell is then effected by capacitor discharge. This welding method has the advantage of supplying a reliable welding current in a very short period of time, for example, of the order of 1/25 of a second.

In this way, during the welding operation, the edges 3 or 3' of the collector plate 1 or 1' are embedded by welding in the projecting bared parts of the electrodes of the cell or generator.

The current supplied by the welding machine passes from one electrode 8 of the machine to one vertical bar of the H of the plate 1 or 1' on which that electrode is pressed, then to the edge 3 or 3' carried by that bar and to the bare projecting parts of the electrode or electrodes of the cell which are in contact with that edge, thence through the bare projecting parts of the electrode or electrodes of the cell which are in contact with the edge 3 or 3' carried by the other vertical bar of the H of the plate 1 or 1' and through that other bar, and lastly, through the electrode 9 of the welding machine applied with pressure against that other bar.

According to this process, it is not necessary to provide an auxiliary electrode for the welding operation, this being an advantage over methods used at present.

FIG. 3 illustrates the welding operation and FIG. 4 shows the block of electrodes and separators after a current collector plate has been united to the electrode or electrodes of one polarity into the assembly.

The assembly of electrodes and separators is designed by reference 6. Its dimensions are kept equal to the dimensions it should have in the finished cell by means of a surrounding ring 7 made of metal, for example.

References 8 and 9 designate the electrodes of the capacitor discharge welding machine which are applied against the bars 2 or 2' of the plate 1 or 1'.

As can be seen by referring to FIG. 5, the edges 3 carried by the collector plate 1 are, after the welding operation, truly embedded and welded in the bare projecting parts of one of the wound electrodes.

After application to the other end of the assembly 6 of a second collector plate 1' by the same method and having, for example, the configuration shown in FIG. 2, the assembly 6 is inserted in a cup-like metallic casing (not shown), the plate 1 being in contact with the bottom of such casing. An electrical weld is, to great advantage, effected between the plate and the bottom of the casing. For that purpose, the horizontal bar of the H of the plate 1 can comprise a slight central boss designated by reference 10 in FIG. 1. Then, the assemblying of the cell is completed more particularly by welding the tab 4 of the plate 1' to the cover of the casing.

Circumstances may make it necessary to provide larger current flow segments for the current collector plate. The embodiment illustrated in FIG. 6 may, to great advantage, be used for the current collector plate. The metal plate 11 is in the shape of a cross whose pair of branch arms 12 are each fitted with embedding edges 13 similar to edges 3 or 3' of FIGS. 1 and 2. Moreover, these branch arms are provided with recesses 14. In the center of that cross, a boss 15 may be provided.

In another embodiment, the boss may be replaced by a recess similar to recess 5 and the current collector plate may be completed by a tab similar to tab 4 which can be folded down.

The application of the current collector plate 11 illustrated in FIG. 6 to an end of an electrode separator assembly is effected in a similar way to that in FIG. 3. However, the capacitor discharge welding operation comprises two phases: in a first phase, the electrodes of the welding machine are applied under similar pressure against one of the arms 12 of the cross and, in a second phase, they are applied similarly against the other arm.

The device and characteristics described in the case of the assemblies of electrodes and separators formed by wound electrodes are applied in a similar way when the electrodes are plane and the assembly consists of a stack of these electrodes with alternate positive and negative electrodes and interposed separators.

It must be understood that the invention is in no way limited to the embodiments described and illustrated, which have been given only by way of examples. More particularly, without departing from the scope of the claimed invention, details may be modified, certain arrangements may be changed or certain means may be replaced by equivalent means. There is no intention, therefore, of limitation to the exact disclosure herein presented.

What is claimed is:

1. Electric cell comprising an assembly of electrodes of opposite polarity and separators, said electrodes respectively having conductive parts projecting respectively at opposite locations of the assembly, a current collector plate welded to the conductive parts at said opposite locations, each said plate comprising edges extending substantially perpendicular to its average plane, said edges of each plate being embedded in and welded in the respective bare conductive projecting parts of said electrodes.

2. Cell according to claim 1, wherein each current collector plate comprises recesses.

3. Cell according to claim 1 wherein each current collector plate is H-shaped, the said extending edges being provided on vertical bars of the H.

4. Cell according to claim 1, wherein the current collector plate has cruciform shape.

5. Cell according to claim 1, wherein the current collector plate has a central recess.

6. Cell according to claim 1, wherein the current collector plate has a centrally located boss.

7. Cell according to claim 1, wherein the current collector plate includes a tab which can be folded over.

8. Cell according to claim 2, wherein each current collector plate has cruciform shape.

References Cited
UNITED STATES PATENTS

| | | | |
|---|---|---|---|
| 380,554 | 4/1888 | Bernardos | 136—70 |
| 3,393,095 | 7/1968 | Philipp | 136—14 |
| 3,503,806 | 3/1970 | Sugalski | 136—13 |
| 3,505,121 | 4/1970 | Bougaran | 136—134 X |
| 3,565,690 | 2/1971 | Jouchaud Duplessix et al. | 136—13 |
| 3,650,842 | 3/1972 | Bougaran | 136—134 |

ANTHONY SKAPARS, Primary Examiner

U.S. Cl. X.R.

136—134